April 21, 1942. F. E. DAVENPORT 2,280,380
TIRE REMOVING TOOL
Filed April 8, 1941
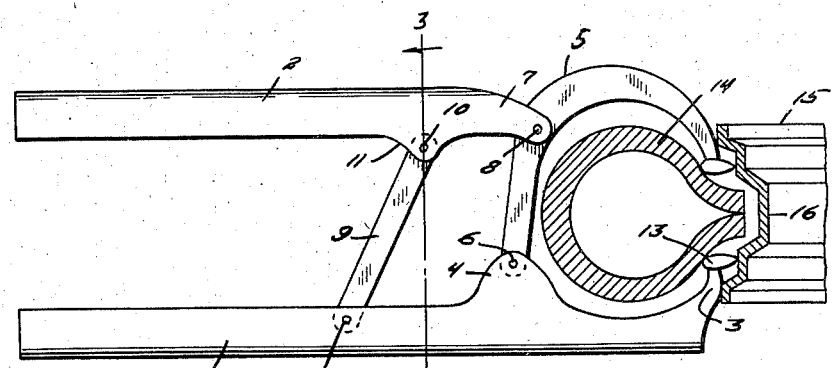
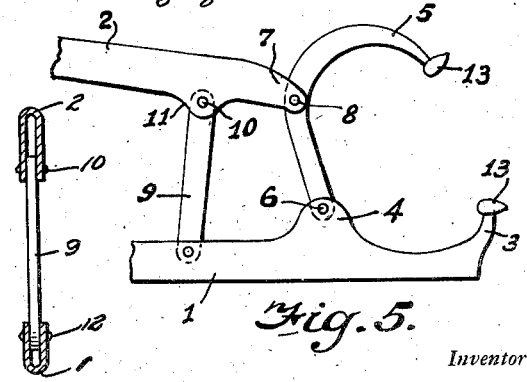
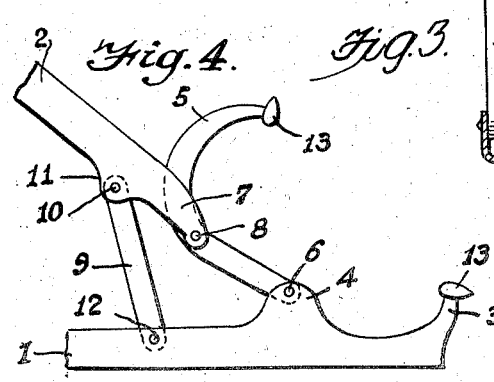
Inventor
FRANK E. DAVENPORT
By Clarence A. O'Brien
Attorney Patented Apr. 21, 1942

2,280,380

UNITED STATES PATENT OFFICE 2,280,380

TIRE REMOVING TOOL

Frank E. Davenport, Geneva, Iowa

Application April 8, 1941, Serial No. 387,536

2 Claims. (Cl. 157—6)

My invention relates to improvements in tire removing tools, the principal object in view being to provide a lightweight, strong tool for straddling a pneumatic tire and which is easily operative into locked position to compress the beads of the tire together so that said beads may enter the low part of a drop center rim at one side thereof and the tire may be pried off the rim at the other side, as for instance, with the usual tire iron.

To the accomplishment of the above, and subordinate objects presently appearing, a preferred embodiment of my invention has been illustrated in the accompanying drawing, set forth in detail in the succeeding description, and defined in the claims appended hereto.

In said drawing:

Figure 1 is a view in side elevation illustrating the preferred embodiment of my improved tire removing tool and the use thereof, Figure 2 is a view in edge elevation, Figure 3 is a view in transverse section taken on the line 3—3 of Figure 1.

Figure 4 is a view in side elevation illustrating the tool fully opened, and

Figure 5 is a similar view illustrating the relation of the parts as they pass dead-center position.

Referring to the drawing by numerals, the illustrated embodiment of my improved tool comprises a pair of relatively long and short, flat levers 1, 2, of channeled form opposed edgewise in a common plane, channels facing, the long lever terminating in a front end grappling hook 3 and being provided with a pair of opposed ear-like extensions 4 on its inner edge spaced inwardly from the hook 3. A flat, metal grappling hook 5 is pivoted at one end, as at 6, to the ears 4 to swing therebetween in the plane of the levers 1, 2, toward and from the hook 3. The short lever 2 has a divided front end 7 straddling the grappling hook 5 and pivoted, as at 8, to the same intermediate the ends thereof. A flat, straight link 9 has one end pivoted, as at 10, to a pair of edge ears 11 on the short lever 2 spaced inwardly from the pivot 8, and its other end similarly pivoted, as at 12, between the sides of the long lever 1 inwardly of the pivot 6. The pivots 8, 10, are closer together than the pivots 6, 12, so that the levers 1 and 2 may be moved apart to swing the hook 5 away from the hook 3, and whereby said levers may be moved toward each other to similarly operate said hooks 3, 5, and to swing the links 9 on the pivots 10, 12, until the pivot 10 is swung inwardly and forwardly past a dead center position relative to the pivots 8 and 12 to thereby form an overthrow dead center lock when the free ends of the hooks 3 and 5 are close together.

The hooks 3, 5, are provided on their free ends with elongated, transversely extending, rounded tips 13 which may be easily wedged in between a tire 14 and the sides of a drop center rim 15 without damaging the tire.

The use and operation of my improved tool will be readily understood. The levers 1, 2, are separated on the pivots 8, 10, 12, to swing the hooks 3, 5, away from each other on the pivot 6 so as to place the latter upon opposite sides of the tire 14. The longer lever 1 is held stationary and the shorter one 2 moved toward the long one to cause the hooks 3, 5, to approach each other in a manner which will be clear and squeeze the sides of the tire 14 therebetween. At the same time, the tips 13 of the hooks 3, 5, are forced in between the beads of the tire 14 and the sides 16 of the rim 15 as shown in Figure 1. When the levers 1, 2, have been swung toward each other in degree sufficient for the link 9 to form the overthrow dead center lock described, the tool is locked in clamping relation to the tire 14, as will be clear, against opening, the tips 13 holding the beads of the tire 14 close together, as shown in Figure 1, so that the portion of the tire clamped by the tool may enter the drop center 17 of the rim 15 and permit the opposite side of the tire to be easily pried off of the rim.

The foregoing will, it is believed, suffice to impart a clear understanding of my invention without further explanation.

Manifestly the invention, as described, is susceptible of modification and if no departure is made from the scope of the claims.

What I claim is:

1. A tool of the class described comprising a pair of relatively long and short flat levers opposed in edge to edge relation, the longer lever terminating in a grapping hook end, a second grappling hook pivoted at one end to the longer lever in the rear of the terminal hook thereof, the shorter lever being pivoted at one end to the second grappling hook intermediate the ends of the latter, and a link having its ends pivotally connected to the long and short levers, respectively, in the rear of the pivotal connections of the second grappling hook and said short lever, said pivotal connections of said link to said levers being spaced different distances from the pivotal connections of said second grappling lever and that of the short lever.

2. A tool of the class described comprising a pair of relatively long and short flat levers opposed in edge to edge relation, the longer lever terminating in a grappling hook end, a second grappling hook pivoted at one end to the longer lever in the rear of the terminal hook thereof, the shorter lever being pivoted at one end to the second grappling hook intermediate the ends of the latter, and a link having its ends pivotally connected to the long and short levers, respectively, in the rear of the pivotal connections of the second grappling hook and said short lever, said pivotal connections of said link to said levers being spaced different distances from the pivotal connections of said second grappling lever and that of the short lever, said hook members being provided with elongated rounded tips extending lengthwise transversely thereof.

FRANK E. DAVENPORT.